(12) United States Patent
Rabeler

(10) Patent No.: US 6,594,746 B2
(45) Date of Patent: Jul. 15, 2003

(54) CHIP CARD WITH INTEGRATED CIRCUIT

(75) Inventor: Thorwald Rabeler, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/246,662

(22) Filed: Feb. 5, 1999

(65) Prior Publication Data

US 2002/0169943 A1 Nov. 14, 2002

(30) Foreign Application Priority Data

Feb. 6, 1998 (DE) .......................................... 198 04 784

(51) Int. Cl.[7] .............................................. G06F 12/00
(52) U.S. Cl. ....................... 711/163; 711/152; 713/200; 712/43; 235/382
(58) Field of Search .......................... 712/43; 711/163, 711/166; 713/200, 172, 189, 159; 709/100; 365/185.04, 185.32, 195; 235/380, 382; 710/261; 705/66

(56) References Cited

U.S. PATENT DOCUMENTS

| | | | | |
|---|---|---|---|---|
| 5,491,827 A | * | 2/1996 | Holtey | 711/163 |
| 5,600,818 A | * | 2/1997 | Weikmann | 711/163 |
| 5,701,493 A | * | 12/1997 | Jaggar | 710/261 |
| 5,754,762 A | * | 5/1998 | Kuo et al. | 713/200 |
| 5,963,980 A | * | 10/1999 | Coulier et al. | 711/163 |
| 6,003,134 A | * | 12/1999 | Kuo et al. | 713/200 |
| 6,034,889 A | * | 3/2000 | Mani et al. | 365/185.04 |

FOREIGN PATENT DOCUMENTS

| | | | |
|---|---|---|---|
| DE | 0512 542 A | * | 11/1992 |
| JP | 0610 886 A | * | 8/1994 |

* cited by examiner

*Primary Examiner*—Do Hyun Yoo
*Assistant Examiner*—Nasser Moazzami
(74) *Attorney, Agent, or Firm*—Gwenaelle Le Pennec

(57) ABSTRACT

Chip cards comprising a microprocessor and a memory are used for various applications. It is also desirable that such chip cards can be used for different applications. This requires a strict and reliable separation of the various user programs so that mutual accessing is not possible. This is achieved notably by subdivision into a system mode, in which all access rights are free, and a user mode which is adjusted by way of a given bit in the program status word. This mode bit controls inter alia a separation in the bus for the special function registers so that given registers are not accessible in the user mode. These registers may contain information enabling the access to given memory sections only, so that this access cannot be modified in the user mode. Furthermore, each memory word may contain respective test information which is individually associated with a user program and is compared with the appropriate test information upon reading out, the information read out not being internally transported further in the case of lack of correspondence.

7 Claims, 3 Drawing Sheets

CHIP CARD WITH INTEGRATED CIRCUIT

BACKGROUND OF THE INVENTION

The invention relates to a chip card which includes an integrated circuit provided with a control unit in the form of a microprocessor and memories. Chip cards of this kind are generally known and are used for various purposes. Such chip cards are often used for applications where the card contains security-relevant information. This is so, for example in the case of bank cards which contain a balance or credit lines and also personal secret numbers, or in the case of patient cards which contain confidential information concerning the patient which should be readable, for example only after entry of a personal secret number. Furthermore, such cards are used for controlling the access to given rooms or buildings. It is also desirable that a chip card is suitable for a plurality of applications in that separate user programs are contained in the memory but only the desired program may be addressable. In such cases it is particularly important that data and parts of a user program cannot be accessed by another user program.

SUMMARY OF THE INVENTION

It is an object of the invention to provide a chip card with a microprocessor and memories which precludes as reliably as possible the unauthorized, i.e. undesirable, accessing of data, notably of a user program, by another user program or by other manipulations for the purpose of reading out or modification.

This object is achieved mainly in that the program status word register (PSW register) contains at least one mode bit whose value indicates a user mode or a system mode. In the user mode, the corresponding bit value of the mode bit inhibits the access to at least parts of the PSW register as well as to all register and memory segments which are used only in the system mode. Consequently, all such registers and memories, containing security-relevant information, can be accessed only in the system mode. The system mode operates with a permanently stored program which, evidently, cannot be read out or modified from the outside. This program is independent of the relevant applications.

This offers the advantage that such a system program need be tested only once in respect of its security-relevant functions so as to be released. The user programs, generated and loaded onto the cards by the appropriate institutions such as banks or health insurance companies, need not be specially tested in that case. Each access to secret data in the framework of an application program takes place exclusively via the system program. This is also particularly important for chip cards which serve for more than one application. The system program ensures that all different user programs are unambiguously and reliably separated from one another and that no user program can access any other user program or data used therein.

For the authorized accessing of secret data used in a user program a given jump is always triggered in the system program so as to switch over the mode bit. All registers and all memory locations are accessible in the system mode. On the other hand, however, it can be reliably checked in the system mode whether the requested access is indeed permissible. This test cannot be deactivated by a fraudulent user. Every data input operation and every output operation is also equivalent to an access to secret data.

The inhibition of memory locations and the release of given memory location segments for a respective user program are simply realized in that the memory is subdivided into given zones, also referred to as segments, different user programs then being effectively associated with different segments. The segments are determined by the content of one or more corresponding registers which can be modified only in the system mode. Consequently, memory zones of different user programs are reliably isolated from one another.

Moreover, within a segment the access to only a part of the segment can be enabled in that additional registers are provided for indicating a limit address within a segment. Each address, i.e. the less significant bits, is automatically compared with the content of such a register. These registers can again be read and written only in the system mode.

Furthermore, the segment register preferably stores a bit group whose value is written into the memory location together with the data written. Upon reading out it is then checked whether the content of the corresponding zone of the memory location corresponds to this bit group. If this is not the case, reading out is inhibited.

If a user program wishes to access a register or a memory location in the user mode without such access being permissible according to this user program, it is possible to output, instead of a special system message, merely a value which corresponds to an empty memory cell, i.e. a cell which has not been written after the manufacture of the card. Thus, a fraudulent user cannot recognize whether he or she actually accessed an empty memory location or an inhibited memory location. Moreover, such a value corresponds to an unconditional jump in the system mode.

The inhibition of all inadmissible memory zones thus takes place via registers which can be modified only in the system mode. These registers form at least a part of the special function or SF registers. These registers are interconnected via a bus within the registers. Moreover, this internal register bus has an interface to the internal data bus via which the data can be written into the registers from the data bus or via which the registers can be read out to the data bus. Preferably, the register bus is subdivided by a switch which is closed only in the system mode. This constitutes a very simply possibility for inhibiting the relevant registers and hence indirectly also all non-accessible memory locations.

BRIEF DESCRIPTION OF THE DRAWINGS

Embodiments of the invention will be described in detail hereinafter with reference to the drawing. Therein.

DETAILED DESCRIPTION OF THE PREFERRED EMBODIMENTS

Figure 1:
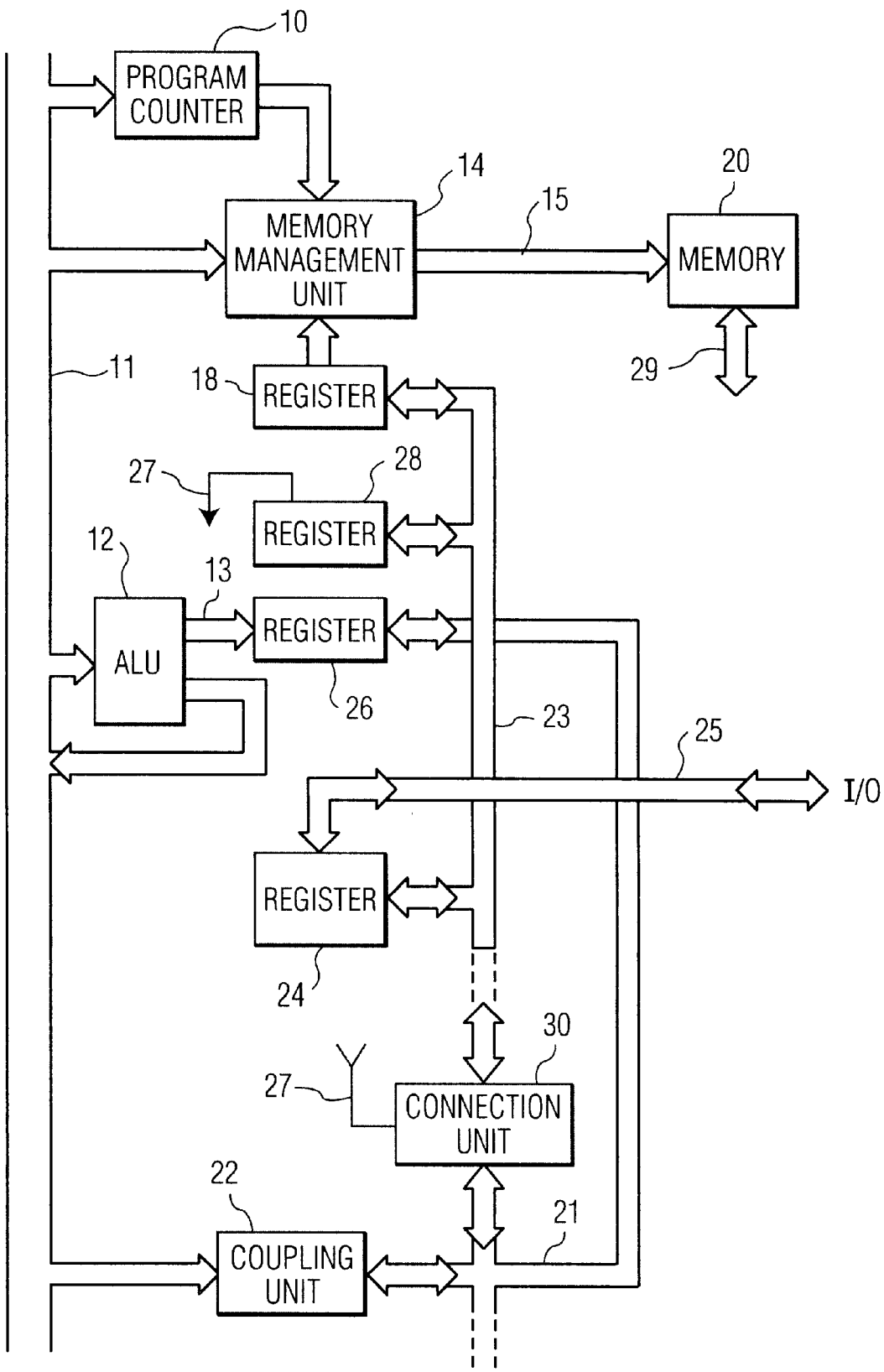
FIG. 1 shows a block diagram with the essential parts of a microprocessor for a chip card.

FIG. 1 shows diagrammatically the parts of a microprocessor which are of essential importance to the invention. A program counter 10, which can be set to a given address via the data bus and otherwise counts autonomously, is connected to an internal bus 11 which includes a number of data leads and control leads. For the sake of clarity, the necessary control signals are shown neither for the program counter nor for the other elements in this Figure and the other Figures.

The program counter 10 delivers its content to a memory management unit MMU 14 which supplies a memory 20 with address signals and control signals via a connection 15. The memory 20 effectively consists of a plurality of memory units, i.e. specifically a ROM for the system program or essential parts thereof, an EEPROM for user programs and given fixed data such as secret numbers, and a volatile RAM which serves notably for the storage of intermediate results during individual processing steps. The individual memories are selected by way of control signals via the connection 15. Data read out from addressed memory locations is output and data to be written into writable memory locations is supplied via a connection 29.

Furthermore, the MMU 14 is connected directly to the bus 11 in order to apply data from the bus 11 as addresses to the memory 20. Moreover, the MMU 14 is connected to registers 18 which are represented as one block for the sake of simplicity and which contain indications as to which memory unit in the memory 20 is to be selected and, additionally, as to which memory zone or address zone in the selected memory unit is addressed. To this end, notably the EEPROM memory unit is subdivided into zones which are generally referred to as segments. Each user program is assigned one or more given segments for program information and data which are defined when the relevant user program is written. These assignments can be modified exclusively by the system program as will be explained in detail hereinafter.

An input of an arithmetic and logic unit ALU 12 is connected to the bus 11. The internal construction of this unit, including notably an arithmetic unit and an accumulator as well as further registers, is known per se and hence is not shown in detail. The results of the unit 12 are applied to the bus 11 again. Moreover, some signals occurring during the execution of the calculations, such as carry signals, overflow signals or zero values, are applied, via a connection 13, to a register 26 which contains a part of the so-called program status word. The second part of the program status word is stored in a register 28.

For the input or output of data, for example from outside the chip card or from a co-processor in the chip card or on the same chip as the microprocessor, there are provided registers 24 which can be loaded, via a connection 25, from outside the microprocessor and can also output data to the environment.

The registers 18, 28 and 24 are interconnected via a special bus 23 which leads to a connection unit 30. Further registers may also be connected to the bus 23 as denoted by the dashed line extending to the connection unit 30. The connection unit 30 is also connected to an internal bus 21 which leads to the register 26 for the one part of the program status word as well as to a coupling unit 22 which connects the bus 21 to the bus 11 when appropriately driven via control leads which are not separately shown. The buses 21 and 23 constitute the customary internal bus for the special function registers in microprocessors. These two parts constitute a unitary bus when the connection unit 30 interconnects the two bus segments by control via the lead 27.

The control lead 27 is connected to a given part of the register 28 which contains a mode bit. The value of this bit determines whether the microprocessor operates in the system mode or in the user mode. When the value of this bit indicates the system mode, the connection unit 30 is driven so as to interconnect the two bus segments 21 and 23, thus forming a unitary bus via which all special function registers, such as the registers 18, 24, 26 and 28 shown as well as possibly further registers which are not shown, are interconnected. Thus, all registers can be accessed in the system mode. Because of the corresponding other value of the mode bit in the user mode, the connection unit 30 is driven, via the control lead 27, so as to separate the two bus segments 21 and 23 from one another. The registers 18, 28 and 24 as well as further registers connected to the bus 23 can then no longer be accessed, i.e. neither for writing nor for reading out.

The transition from the user mode to the system mode is made under the control of a special jump instruction whereby the mode bit in the register 28 is switched to the system mode. At the same time the start of the system program is called whose essential content is fixed so that it cannot be modified. In the system program, for example the register 18 can be modified so as to enable the addressing of other memory units or other segments in a memory unit during the subsequent user program. At the end of the system program, the mode bit in the register 28 is switched back again and hence the connection to the bus 23 is interrupted again in the connection unit 30, via the control lead 27, so that the registers connected thereto can no longer be accessed.

Figure 2:
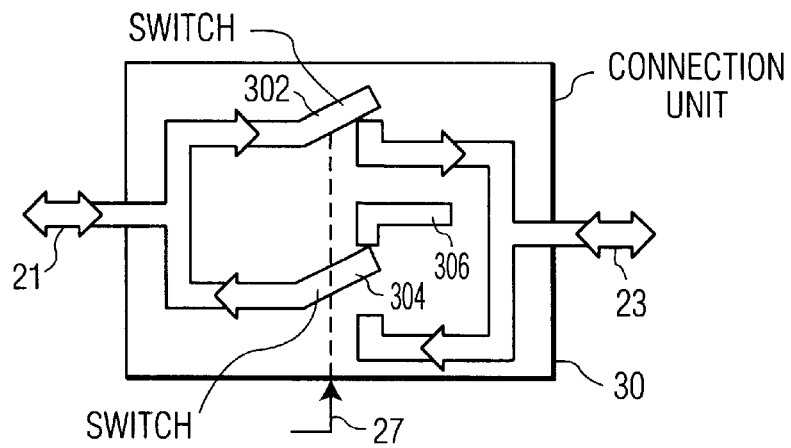
FIG. 2 is a detailed representation of a part thereof.

FIG. 2 is a more detailed representation of the construction of the connection unit 30. The transfer of data from the bus 21 to the bus 23 takes place via a switch 302 whereas the data to be transferred from the bus 23 to the bus 21 is conducted via a switch 304. The switches 302 and 304 are driven together via the control lead 27. In the position of the switches 302 and 304 shown in FIG. 2, the connection is interrupted and data originating from a lead 306 with a fixed data value is transferred to the bus 21. This data value corresponds, for example to the value of the jump instruction whereby a jump to the system mode is made. Therefore, should an inadmissible register be accessed in an inhibited manner in a user program, a value corresponding to the jump instruction is read out. If this value is to be interpreted as an instruction, such an inhibited access always triggers a jump to the system mode in which only fixed instruction sequences which cannot be modified by a user are executed.

Figure 3:
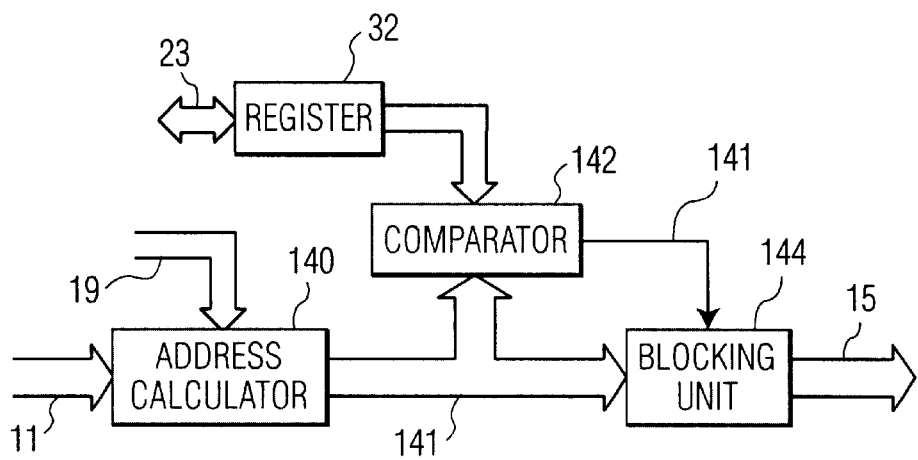
FIG. 3 shows a block diagram for the testing of address limits.

FIG. 3 is a more detailed representation of some parts of the MMU 14. The connection to the bus 11 leads to an address calculator 140 in which the data from the bus 11 is combined, as an address, with a more significant address part, arriving from the register 18 in FIG. 1, via the connection 19, so as to be output via the connection 141. The connection 141 leads to a blocking unit 144 and a comparator 142. A second input of the comparator 142 is connected to the output of a register 32 which is also connected, as a special function register, to the bus 23 and is accessible only in the system mode and can be loaded with a value for an address limit in the system mode. The address limit is preferably compared with parts of the address on the connection 141 and, if the address is situated within the predetermined limit, the comparator 142 enables the blocking unit 144, via the lead 141, and the address is applied to the memory 20 of FIG. 1 via the connection 15. The access to a part of a segment associated with the relevant user program can thus be inhibited in the user mode.

Figure 4:
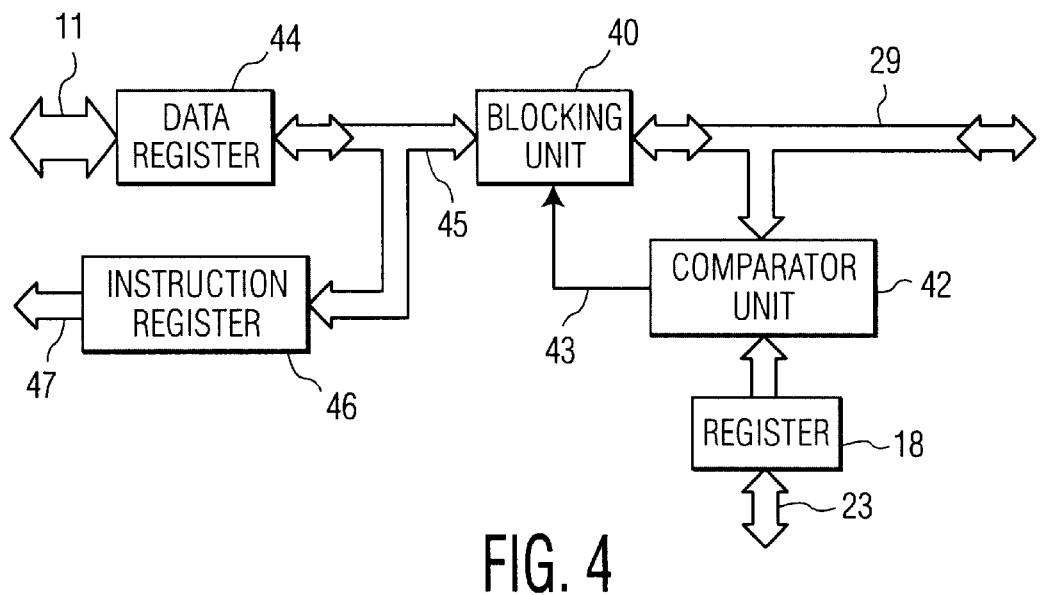
FIG. 4 shows a block diagram for testing the content of memory locations, FIG. 5 symbolically represents the subdivision into the protected system zone and the non-protected user zone.

A further protection against the accessing of inhibited data is diagrammatically shown in FIG. 4. When the content of a memory location of the memory 20 of FIG. 1 is read out and the corresponding data is output via the connection 29, the data is applied to a comparator 42 and to a further blocking unit 40. A further input of the comparator 42 receives data from the register 18 which has been loaded via the bus 23. The comparator 42 checks given parts of the data word on the connection 29 for correspondence to the data supplied by the register 18. The blocking unit 40 is released, via the lead 43, only in the case of correspondence and the data is then output via the connection 45. This data is written into a data register 44 in dependence on appropriate control signals on control leads which are not separately shown, said data register 44 applying the data to the bus 11, or into an instruction register 46 which applies this data as an instruction to an instruction decoder (not shown).

If data is to be written into the memory 20 of FIG. 1 from the bus 11, via the data register 44, this data is again conducted to the blocking unit 40 in which it is supplemented by data in conformity with the content of the register 18 after which it is written into the memory 20 via the connection 29. As a result, when this data is read during the associated user program the necessary correspondence to the content of the register 18 is detected. During another user program, in which this test data has a different value, therefore, data of a different user program cannot be accessed.

Figure 5:
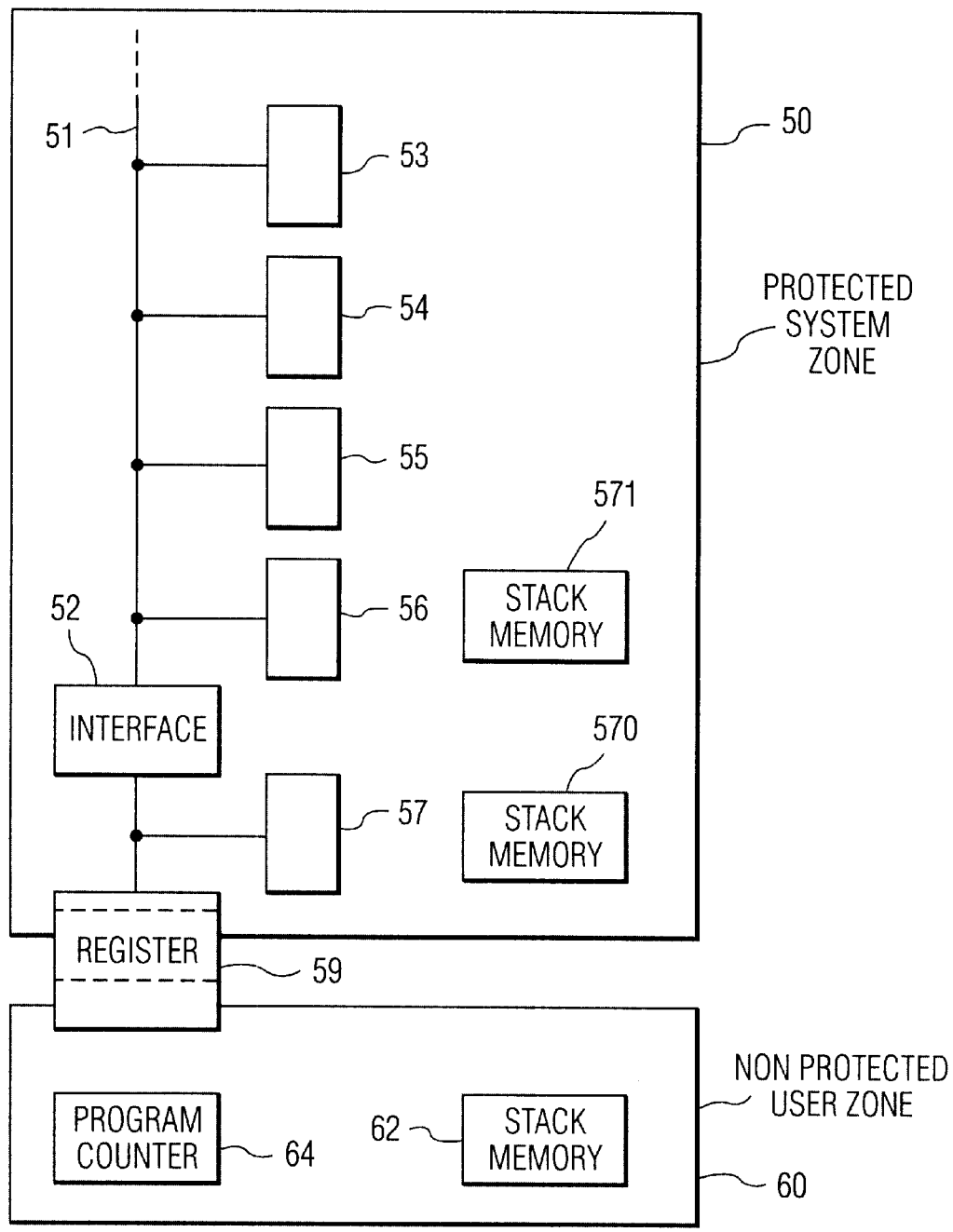

FIG. 5 shows symbolically the subdivision into a protected system zone 50 and a non-protected user zone 60. In the user zone 60 the access to a stack memory 62 and the program counter 64 is enabled. Moreover, one half of the register 59 for the program status word is available to the user zone. The other part of the register 59 is available only to the system zone 50. Therein, the system stack memory 570, 571 can be accessed via the register 57; moreover, via an interface 52 to the bus for the special function registers, such as a register 56 for controlling the write enable in the memory and the register 55 for the accessing of memories as well as the register 54 for input/output operations and a register 53 for a coprocessor which is preferably provided on the same chip, can also be accessed. Other registers of this kind (not shown) may also be provided.

The units indicated in the system zone 50 can be accessed only when the mode bit has been set. In the user zone the units 62 and 64 shown therein can be accessed, but the units shown in the system section 50 cannot be accessed.

Figure 6:
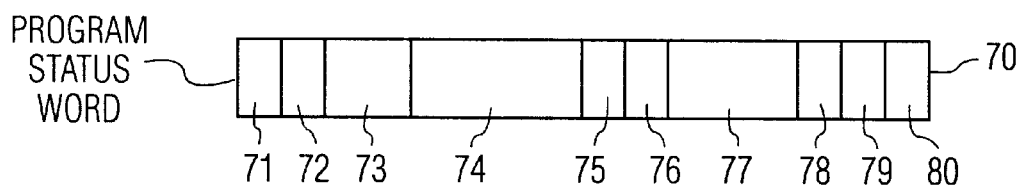
FIG. 6 shows an example of the composition of a program status word in two separate registers.

FIG. 6 shows an example of the composition of a program status word 70. The section 71 contains the mode bit. The section 72 contains a bit which can be used to check the program execution; this is important notably for the formation of programs. The content of the section 73 serves for register selection. The content of the section 74 serves to mask interrupt requests. These sections belong to the half of the program status word which can be modified only in the system mode.

The part behind the double stroke can also be read and modified in the user mode and comprises two sections 75 and 76 in which carry signals, arising in the ALU 12 of FIG. 1, are stored. The section 77 can be defined substantially independently of the user program. The section 78 stores the message that an overflow has occurred in the ALU 12 of FIG. 1. The section 79 indicates that a negative result has occurred in the ALU 12 and the section 80 indicates that the value zero has occurred during calculation. Because these are only signals of the ALU 12 of FIG. 1, the accessing of these sections must also be possible in the user mode.

What is claimed is:

1. A chip card comprising:
    an integrated circuit provided with a microprocessor, and at least one memory with a plurality of memory segments that can be accessed via addresses, wherein
    the microprocessor includes a plurality of registers, at least a program status word (PSW) register of which contains a program status word in which a value of at least one predetermined mode bit determines a user mode or a system mode and the at least one predetermined bit is not comprised in an address word, and,
    the access to at least parts of the program status word register as well as to all registers and memory segments which are used only in the system mode is inhibited when the at least one predetermined mode bit indicates the user mode.

2. A chip card as claimed in claim 1, in which the PSW register consists of at least one first sub-register and one second sub-register, the first sub-register containing the at least one predetermined mode bit as well as information for the selection of one from a plurality of register blocks and being readable and modifiable only in the system mode.

3. A chip card as claimed in claim 1, in which each interrupt request occurring in the user mode triggers a jump to the system mode which switches over the at least one predetermined mode bit, and all registers which serve for input/output operations and for the control of control circuits coupled to the microprocessor are used only in the system mode.

4. A chip card as claimed in claim 1, in which at least one of the registers is a first segment address register which contains an address of a memory segment containing data for a current program being executed, and at least one further register is a second segment address register which contains an address of a preferably other memory segment, modification of the first and the second segment address registers being inhibited in the user mode.

5. A chip card as claimed in claim 1, wherein at least one of the registers is a segment address register which contains an address of a memory segment containing data for a program, and further comprising:
    address registers, each of which indicates a respective address of a memory location within the memory segment, each address register having an associated auxiliary address register which can be modified only in the system mode and contains at least the most significant bits of the respective address as well as test information; and,
    a comparator which compares the test information with an information read from the addressed memory location and, in the user mode, further enables a transport or a modification of the information read from the addressed memory location when the test information and the information read from the addressed memory location match.

6. A chip card as claimed in claim 1, in which a register which is addressed in the user mode and is used only in the system mode delivers only a predetermined bit pattern, preferably being the bit pattern of a memory location that has not been modified after the manufacture of the integrated circuit.

7. A chip card as claimed in claim 1, in which the registers are connected via a bus to the remainder of the circuit of the microprocessor in such a manner that the registers which are used only in the system mode are arranged at the end of the bus which is remote from the microprocessor and the chip card further comprises an inhibit gate inserted in the bus so as to precede said registers, the inhibit gate being controlled by the at least one predetermined mode bit.

* * * * *